United States Patent [10] Patent No.: US 10,262,144 B2
Duale et al. (45) Date of Patent: Apr. 16, 2019

(54) VERIFYING PROPER OPERATION OF THE INSTRUCTION EXECUTION PROTECTION ARCHITECTURE

(71) Applicant: INTERNATIONAL BUSINESS MACHINES CORPORATION, Armonk, NY (US)

(72) Inventors: Ali Y. Duale, Poughkeepsie, NY (US); Shailesh R. Gami, Poughkeepsie, NY (US); John L. Weber, Tillson, NY (US); Dennis Wittig, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 273 days.

(21) Appl. No.: 15/379,772

(22) Filed: Dec. 15, 2016

(65) Prior Publication Data

US 2018/0173880 A1 Jun. 21, 2018

(51) Int. Cl.
*G06F 21/57* (2013.01)
*G06F 11/36* (2006.01)
*G06F 21/53* (2013.01)

(52) U.S. Cl.
CPC ........ *G06F 21/577* (2013.01); *G06F 11/3688* (2013.01); *G06F 21/53* (2013.01); *G06F 2221/033* (2013.01)

(58) Field of Classification Search
CPC .... G06F 21/577; G06F 11/3688; G06F 21/53; G06F 2221/033

USPC .......................................................... 726/25
See application file for complete search history.

(56) References Cited

U.S. PATENT DOCUMENTS

| | | | |
|---|---|---|---|
| 7,895,407 B2 | 2/2011 | Dankel et al. | |
| 8,918,885 B2* | 12/2014 | McClure | G06F 21/577 726/25 |
| 2004/0236874 A1* | 11/2004 | Largman | G06F 21/53 710/8 |
| 2008/0244743 A1* | 10/2008 | Largman | G06F 21/53 726/23 |
| 2009/0228673 A1 | 9/2009 | Waters et al. | |
| 2010/0005531 A1* | 1/2010 | Largman | G06F 21/53 726/24 |
| 2013/0212682 A1* | 8/2013 | McClure | G06F 21/577 726/25 |
| 2013/0326177 A1 | 12/2013 | Oiwa | |
| 2015/0096050 A1 | 4/2015 | Lindsay | |

* cited by examiner

*Primary Examiner* — Teshome Hailu
(74) *Attorney, Agent, or Firm* — Cantor Colburn LLP; Teddi Maranzano

(57) ABSTRACT

A computer-implemented method includes executing one or more tests on a computing device. The computing device has Instruction Execution Protection (IEP), and each test of the one or more tests includes selectively setting one or more IEP bits of one or more page tables, where each IEP bit prevents code in a respective storage block from being executed. During the one or more tests, an IEP exception is detected, by a computer processor, each time an attempt is made to execute code in a storage block for which a respective IEP bit is set. Test results of the one or more tests are determined based on the detecting. A remedial action is performed in response to the test results of the one or more tests.

17 Claims, 9 Drawing Sheets

VERIFYING PROPER OPERATION OF THE INSTRUCTION EXECUTION PROTECTION ARCHITECTURE

BACKGROUND

Embodiments of the present invention relate to system testing and, more specifically, to verifying proper operation of the Instruction Execution Protection (IEP) architecture.

Main memory includes both instructions and data. Generally, execution of data should be avoided, as such execution can lead to unexpected results given that data is not meant to be treated as instructions. However, a malicious program may attempt to execute data in memory specifically to harm to the computer system.

IEP is an architecture introduced with zMidas processors of the z System® by International Business Machines®. IEP is designed to prevent data portions of memory from being executed. Specifically, IEP associates a bit with each page table. Page tables provide mappings between virtual addresses and physical addresses in main memory. When the IEP bit of a page table is set, execution of information stored in a virtual address can be prevented, as such execution requires translation through the applicable page table.

SUMMARY

According to an embodiment of the present invention, a computer-implemented method includes executing one or more tests on a computing device. The computing device has Instruction Execution Protection (IEP), and each test of the one or more tests includes selectively setting one or more IEP bits of one or more page tables, where each IEP bit prevents code in a respective storage block from being executed. During the one or more tests, an IEP exception is detected, by a computer processor, each time an attempt is made to execute code in a storage block for which a respective IEP bit is set. Test results of the one or more tests are determined based on the detecting. A remedial action is performed in response to the test results of the one or more tests.

In another embodiment, a system includes a memory having computer-readable instructions and one or more processors for executing the computer-readable instructions. The computer-readable instructions include executing one or more tests on a computing device. The computing device has IEP, and each test of the one or more tests includes selectively setting one or more IEP bits of one or more page tables, where each IEP bit prevents code in a respective storage block from being executed. Further according to the computer-readable instructions, during the one or more tests, an IEP exception is detected each time an attempt is made to execute code in a storage block for which a respective IEP bit is set. Test results of the one or more tests are determined based on the detecting. A remedial action is performed in response to the test results of the one or more tests.

In yet another embodiment, a computer-program product for testing functionality of IEP includes a computer-readable storage medium having program instructions embodied therewith. The program instructions are executable by a processor to cause the processor to perform a method. The method includes executing one or more tests on a computing device. The computing device has IEP, and each test of the one or more tests includes selectively setting one or more IEP bits of one or more page tables, where each IEP bit prevents code in a respective storage block from being executed. Further according to the method, during the one or more tests, an IEP exception is detected each time an attempt is made to execute code in a storage block for which a respective IEP bit is set. Test results of the one or more tests are determined based on the detecting. A remedial action is performed in response to the test results of the one or more tests.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

To ensure that data portions of memory are not executed, it is critical to ensure that Instruction Execution Protection (IEP) is operating as expected on each computing device onto which it is incorporated. Given that IEP is a relatively new technology, there is no conventional mechanism for testing IEP to ensure it operates properly.

Turning now to an overview of aspects of the present invention, some embodiments of a test system verify the functionality of an IEP architecture. Specifically, the test system may verify proper functionality in a uniprocessor environment, a multiprocessor environment, or both. Further, in some embodiments, the test system may operate in a virtual machine, such as by creating a controlled logical partition in which the test system runs.

Figure 1:
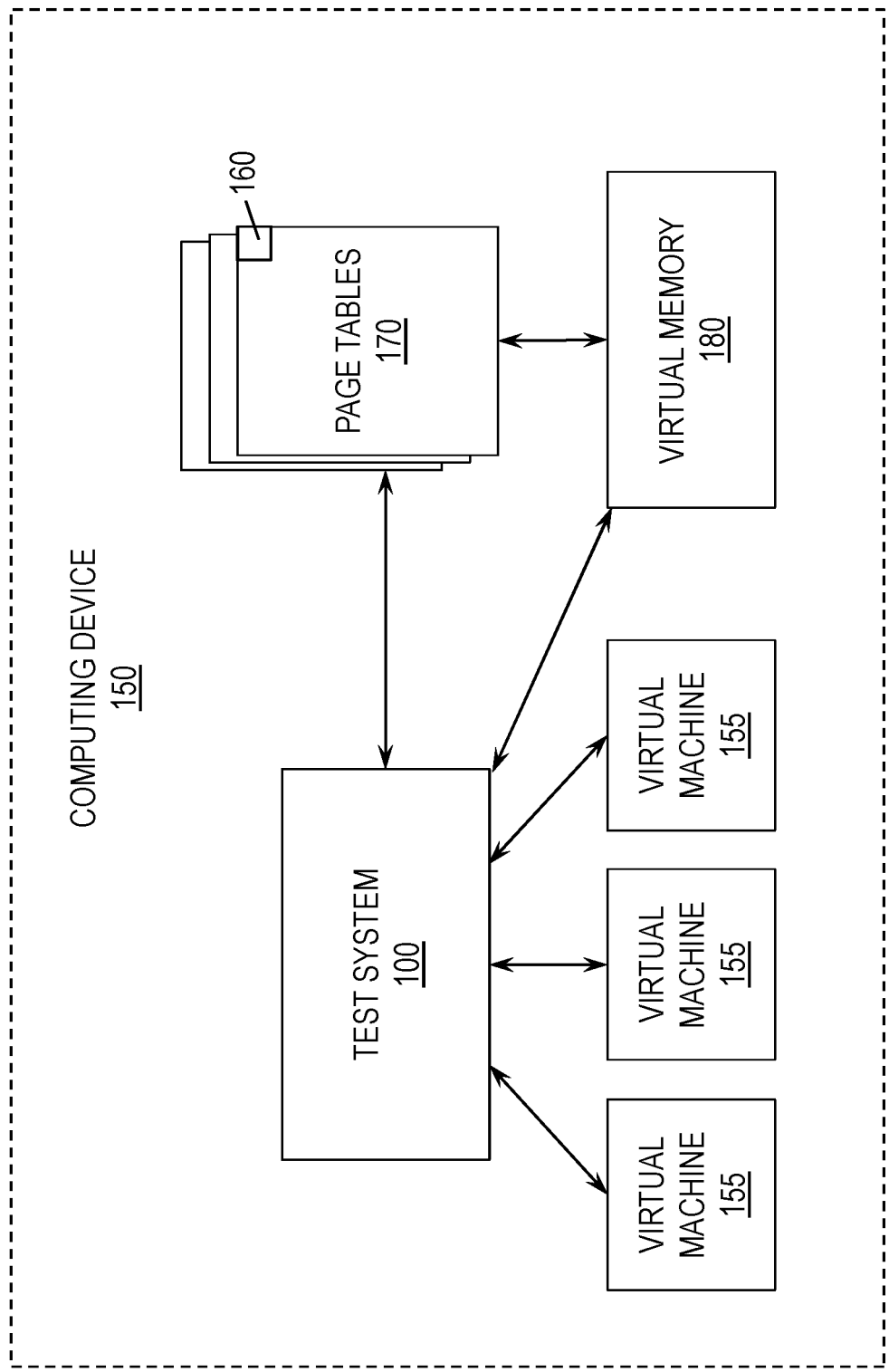
FIG. 1 is a diagram of a test system for verifying the functionality of Instruction Execution Protection (IEP) on a computing device, according to some embodiments of this invention.

FIG. 1 is a diagram of the test system 100 for verifying the functionality of IEP on a computing device 150, according to some embodiments of this invention. More specifically, the test system 100 may selectively set IEP bits 160 of the page tables 170 used to translate between virtual memory 180 and physical memory in the computing device 150, and may then determine whether IEP exceptions occur as expected. In some embodiments, the test system 100 may access one or more virtual machines 155 of the computing device 150, to verify that IEP is operating properly within those virtual machines 155. In some embodiments, the test system 100 may be able to test the functionality of IEP on a uniprocessor system, a multiprocessor system, or both. If one or more virtual machines 155 are being tested, the virtual machines 155 need not have the same processor architecture as one another, and need not have the same processor architecture of the physical computing device 150. Thus, the test system 100 may, in some cases, test the functionality of both uniprocessor and multiprocessor systems on the computing device 150.

The test system 100 may perform one or more tests on the computing device 150 to determine whether IEP is operating properly. Each test performed may have expected results that can be verified through an examination of the memory upon which processors involved are operating. Specifically, for instance, whenever an attempt is made to execute information in a storage block protected by IEP (i.e., corresponding to a page table 170 with a set IEP bit), an IEP exception may occur, and the test system 100 may detect these exceptions as the test results. Thus, the test system 100 may determine whether these exceptions occur at expected points during the tests. It will be understood that other mechanisms exist and can be used for verifying that the tests perform as expected.

Several tests are described below as usable by the test system 100. It will be understood that one or more of these tests may be run by the test system 100 on the computing device 150, and it need not be the case that every such test is run on the computing device 150. Further, it will be understood that one or more other tests may be run by the test system 100 as an alternative to, or in addition to, those described herein.

Figure 2:
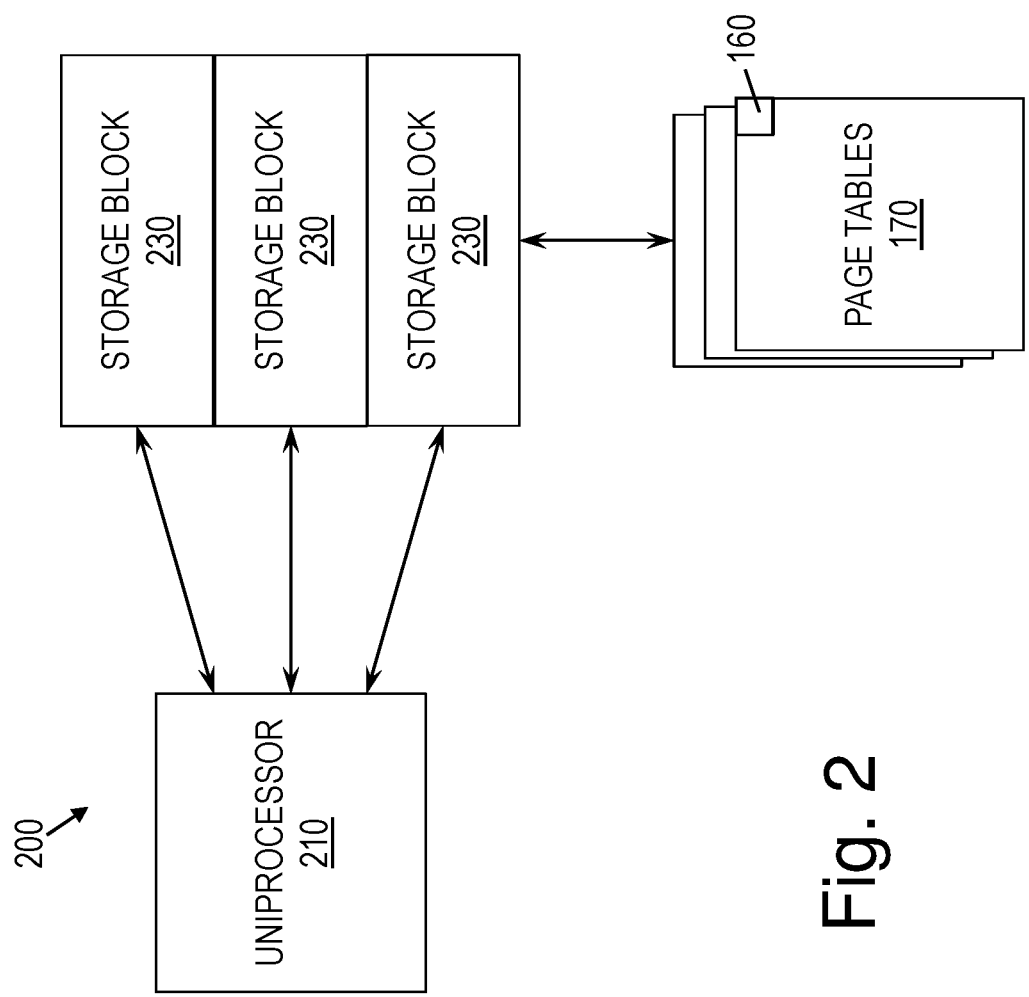
FIG. 2 is a block diagram of a first test of the functionality of IEP, within a uniprocessor system, according to some embodiments of this invention.

FIG. 2 is a block diagram of a first test 200 of the functionality of IEP, within a uniprocessor system, according to some embodiments of this invention. In the first test 200, the test system 100 may instruct a uniprocessor 210 to selectively set the IEP bit 160 of one or more page tables 170, while leaving the IEP bit 160 unset for one or more other page tables 170. In the first test 200, the test system 100 may provide a stream of instructions that include instructions to branch to one or more virtual memory addresses. The one or more virtual memory addresses may reside within a set of one or more storage blocks 230, with each virtual memory address residing in a corresponding storage block 230. Each storage block 230 may be associated with a page table 170, which may or may not have a set IEP bit 160. If the IEP bit 160 associated with the storage block 230 is set, then that storage block 230 may be deemed protected. Assuming IEP is operating correctly, in some embodiments, upon branching to a protected storage block 230, the uniprocessor 210 is unable to execute the information stored in the storage block 230, but upon branching to an unprotected storage block 230, the uniprocessor is able to execute the information stored in the storage block 230. Additionally, in some cases, the first test 200 may execute instructions that walk into a protected storage block 230 from an unprotected storage block 230, upon crossing a page boundary. In those cases, in some embodiments, the expected behavior is for the uniprocessor 210 to be able to execute the information stored in the unprotected storage block 230 but not in the protected storage block 230. The test system 100 may verify that this proper operation of IEP occurs during the first test 200.

Figure 3:
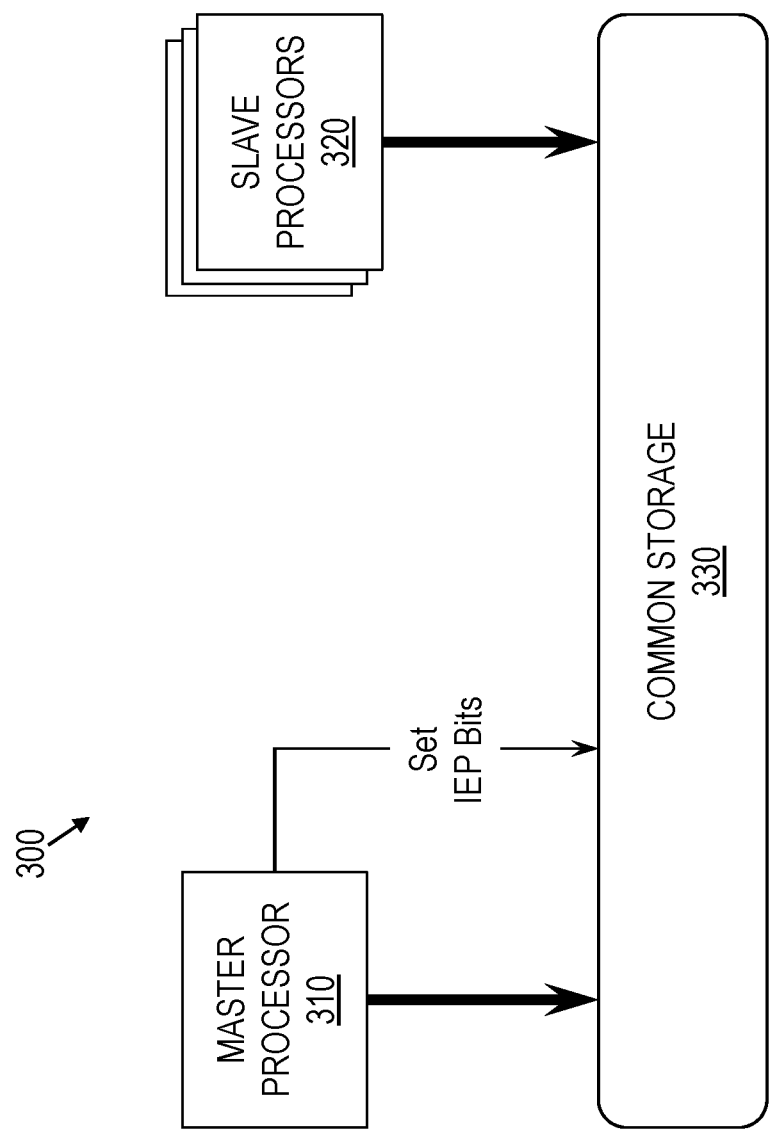
FIG. 3 is a block diagram of a second test of the functionality of IEP, within a multiprocessor system, according to some embodiments of this invention.

FIG. 3 is a block diagram of a second test 300 of the functionality of IEP, within a multiprocessor system, according to some embodiments of this invention. As shown in FIG. 3, a multiprocessor system may include a master processor 310 and one or more slave processors 320. In the second test 300, the master processor 310 and the slave processors 320 may all operate on common storage 330, which may be virtual. As part of the second test 300, the test system 100 may provide the master processor 310 with an instruction stream that causes the master processor to set the IEP bit 160 of one or more page tables 170, while leaving the IEP bit 160 unset for one or more other page tables 170. In the second test 300, both the master processor 310 and the slave processors 320 may execute a stream of instructions, including instructions to execute code in protected storage of the common storage 330. The test system 100 may confirm that the master processor 310 and the slave processors 320 are able to execute code in the unprotected storage of the common storage 330, but are unable to execute code in the protected storage of the common storage 330.

Figure 4:
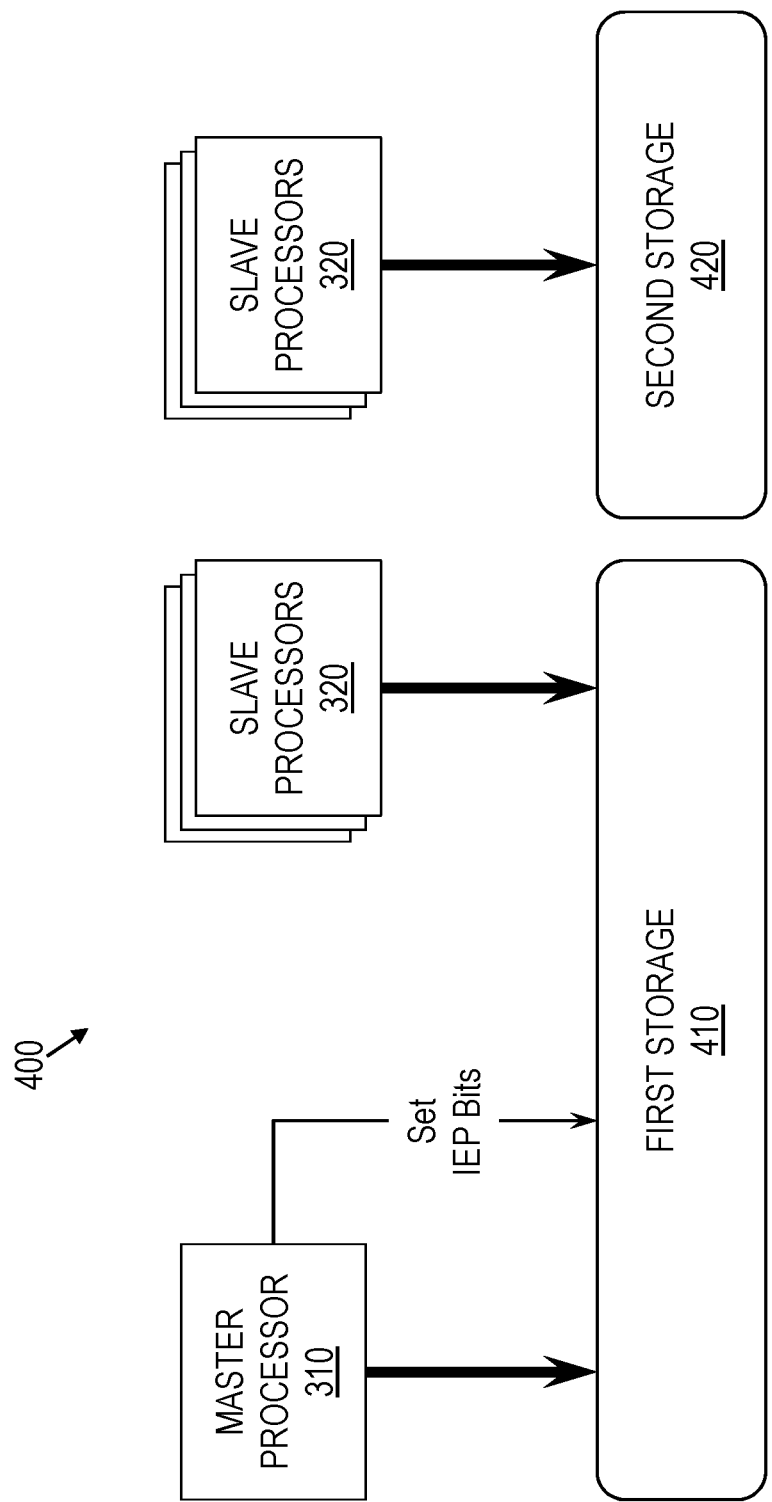
FIG. 4 is a block diagram of a third test of the functionality of IEP, within a multiprocessor system, according to some embodiments of this invention.

FIG. 4 is a diagram of a third test 400 of the functionality of IEP, again within a multiprocessor system, according to some embodiments of this invention. As shown, in this third test 400, the master processor 310 and a first set of slave processors 320 may operate on a first storage 410 in virtual memory, while a second set of slave processors 320 may operate on a second storage 420 of virtual memory, which differs from the first storage 410. As with the previous test on a multiprocessor system, the master processor 310 may be instructed to set the IEP bit 160 for one or more page tables 170, thus protecting the corresponding storage blocks, while leaving the IEP bit 160 unset on one or more other page tables 170. However, because the master processor 310 operates on the first storage 410 and not on the second storage 420, in some embodiments, the expected behavior is for the second set of slave processors 320 operating on the second storage 420 to be able to execute information from each storage block encountered. In contrast, in some embodiments, the master processor 310 and the first set of slave processors 320 operating on the first storage 410 are expected to be able to execute information in unprotected storage blocks but not in protected storage blocks. The test system 100 may verify that this is what occurs during the third test 400.

Figure 5:
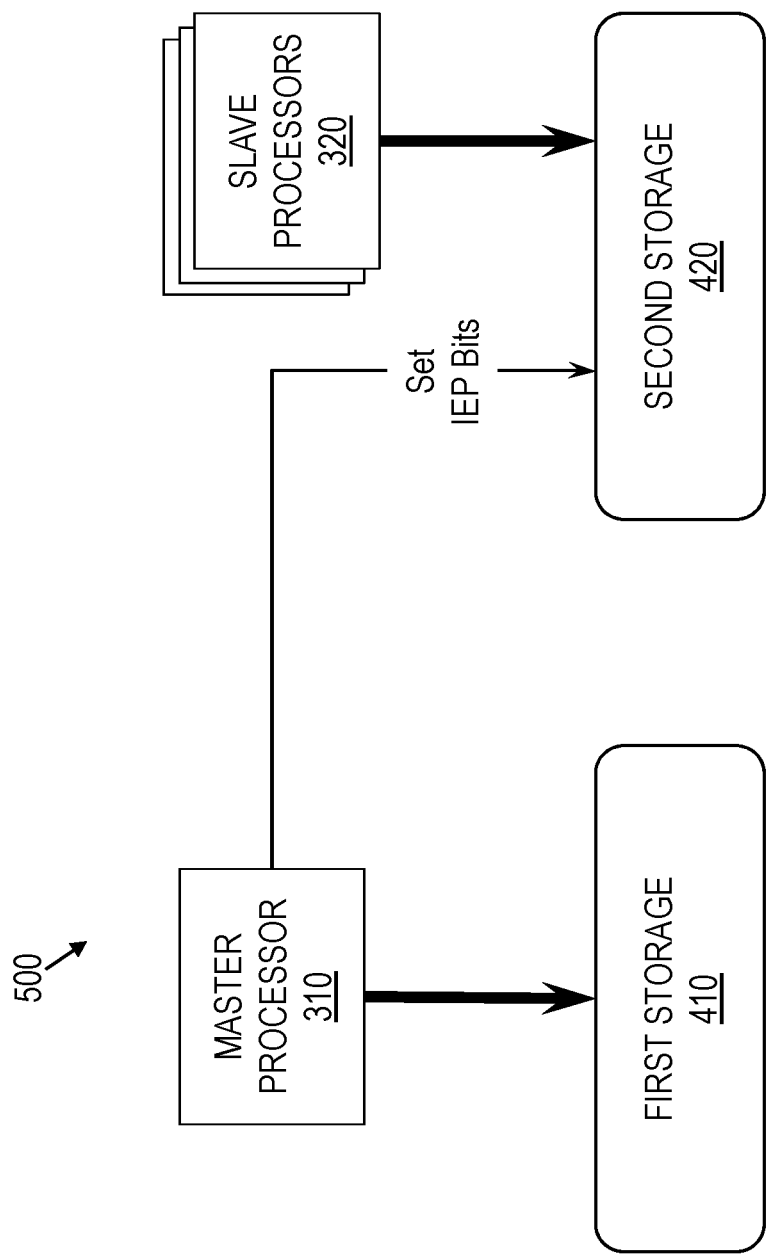
FIG. 5 is a block diagram of a fourth test of the functionality of IEP, within a multiprocessor system, according to some embodiments of this invention.

FIG. 5 is a diagram of a fourth test 500 of the functionality of IEP, again within a multiprocessor system, according to some embodiments. In this fourth test 500, the master processor 310 may operate on the first storage 410 of virtual memory, while one or more slave processors 320 operate on the second storage 420 of virtual memory, which may be distinct from the first storage 410. However, the master processor 310 may set the IEP bit 160 of one or more page tables 170 of the second storage 420, while leaving one or more other IEP bits 160 unset in the second storage 420. In some embodiments, the master processor 310 does not set any IEP bits 160 in the first storage 410. According to some embodiments, the expected behavior is for the slave processors 320 to be able to execute code in unprotected storage blocks while being unable to executed code in protected storage blocks. The master processor 310 may be expected to be able to execute all code it is instructed to execute, as in some embodiments, the master processor 310 is not expected to encounter a protected storage block. The test system 100 may verify that this occurs during execution of the fourth test 500.

Figure 6:
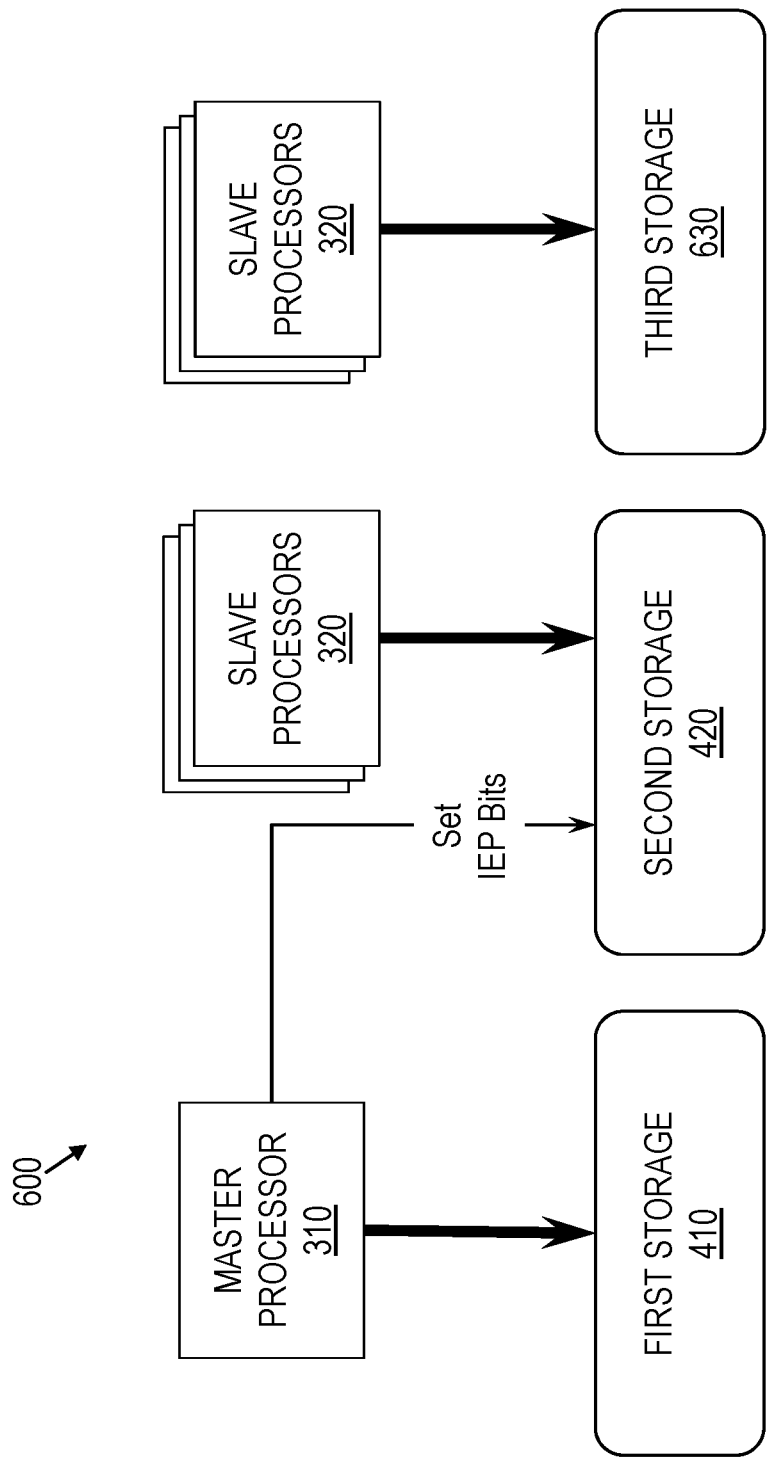
FIG. 6 is a block diagram of a fifth test of the functionality of IEP, within a multiprocessor system, according to some embodiments of this invention.

FIG. 6 is a diagram of a fifth test 600 of the functionality of IEP, again within a multiprocessor system, according to some embodiments. In this fifth test 600, the master processor 310 may operate on a first storage 410 in virtual memory, while a first set of slave processors 320 operate on a second storage 420 that is in virtual memory and distinct from the first storage 410, and while a second set of the slave processors 320 operate on a third storage 630 that is in virtual memory and distinct from the first storage 410 and the second storage 420. The master processor 310 may set the IEP bit 160 of one or more page tables 170 of the second storage 420, while leaving one or more other IEP bits 160 unset in the second storage 420. In some embodiments, the master processor 310 does not set any IEP bits 160 in the first storage 410 or the third storage 630. According to some embodiments, the expected behavior is for the first set of slave processors 320 to be able to execute code in unprotected storage blocks while being unable to executed code in protected storage blocks. The master processor 310 and the second set of slave processors 320 may be expected to be able to execute all code they are instructed to execute, as in some embodiments, they are not expected to encounter a protected storage block. The test system 100 may verify that this occurs during the fifth test 600.

Figure 7:
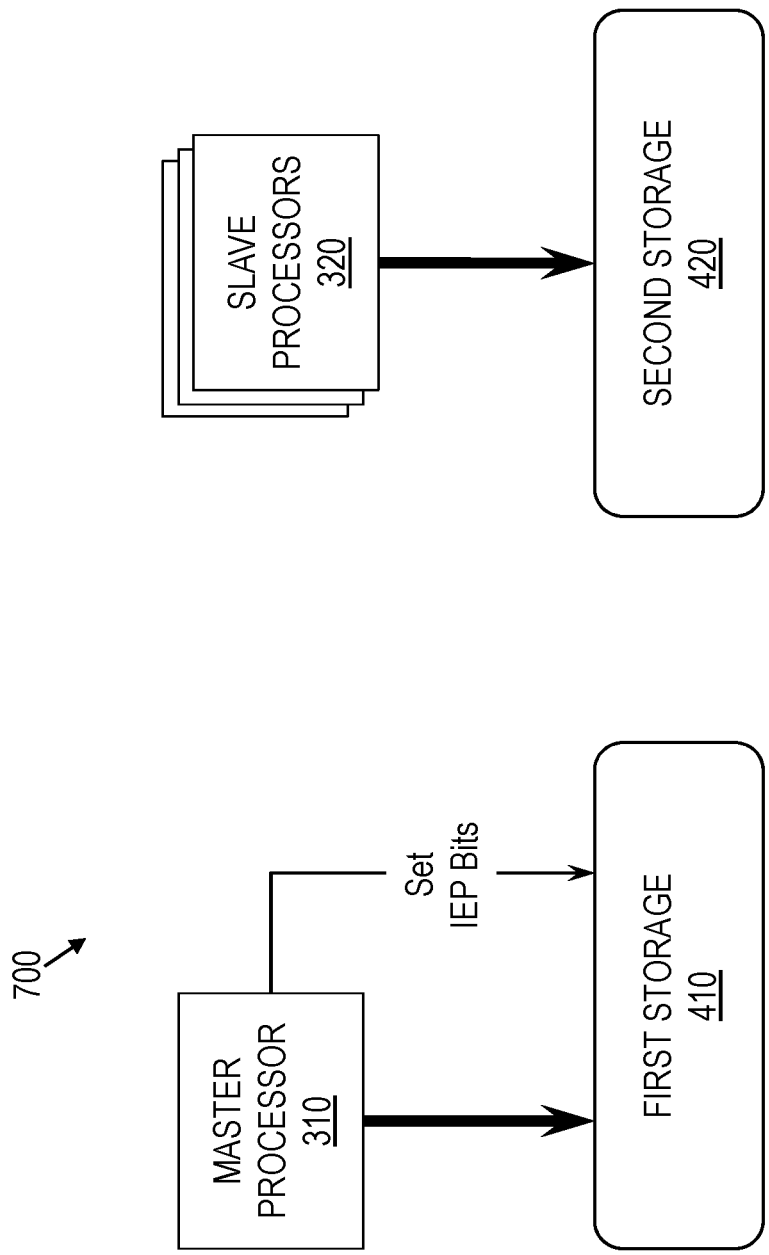
FIG. 7 is a block diagram of a sixth test of the functionality of IEP, within a multiprocessor system, according to some embodiments of this invention.

FIG. 7 is a diagram of a sixth test 700 of the functionality of IEP, again within a multiprocessor system, according to some embodiments. In this sixth test 700, the master processor 310 may operate on a first storage 410 in virtual memory, while one or more slave processors 320 operate on a second storage 420 in virtual memory, where the second storage 420 is distinct from the first storage 410. The master processor 310 may set the IEP bit 160 of one or more page tables 170 of the first storage 410 on which it operates, while leaving one or more other IEP bits 160 unset in the first storage 410. In some embodiments, the master processor 310 does not set any IEP bits 160 in the second storage 420. According to some embodiments, the expected behavior is for the slave processors 320 to encounter only unprotected storage and to be able to execute any code they are instructed to execute. In contrast, in some embodiments, the master processor 310 is able to execute code in unprotected storage blocks while being unable to execute code in protected storage blocks. The test system 100 may verify that this occurs in the sixth test 700.

Regardless of the specific tests performed, the test system 100 may determine whether IEP operates correctly based on whether the results of the tests are as expected. The tests may indicate, for example, whether and where IEP exceptions occurred or whether and where certain code was executed inside and outside protected storage. The results of the tests may be determined based on these indications and, further, may indicate whether IEP operates correctly and, if not, in what way IEP is operating incorrectly. After performing one or more tests, the test system 100 may automatically perform a remedial action in response to the results of those tests. In some embodiments, the remedial action may include reporting the results of the tests, thus enabling manual or automatic handling of the results.

Figure 8:
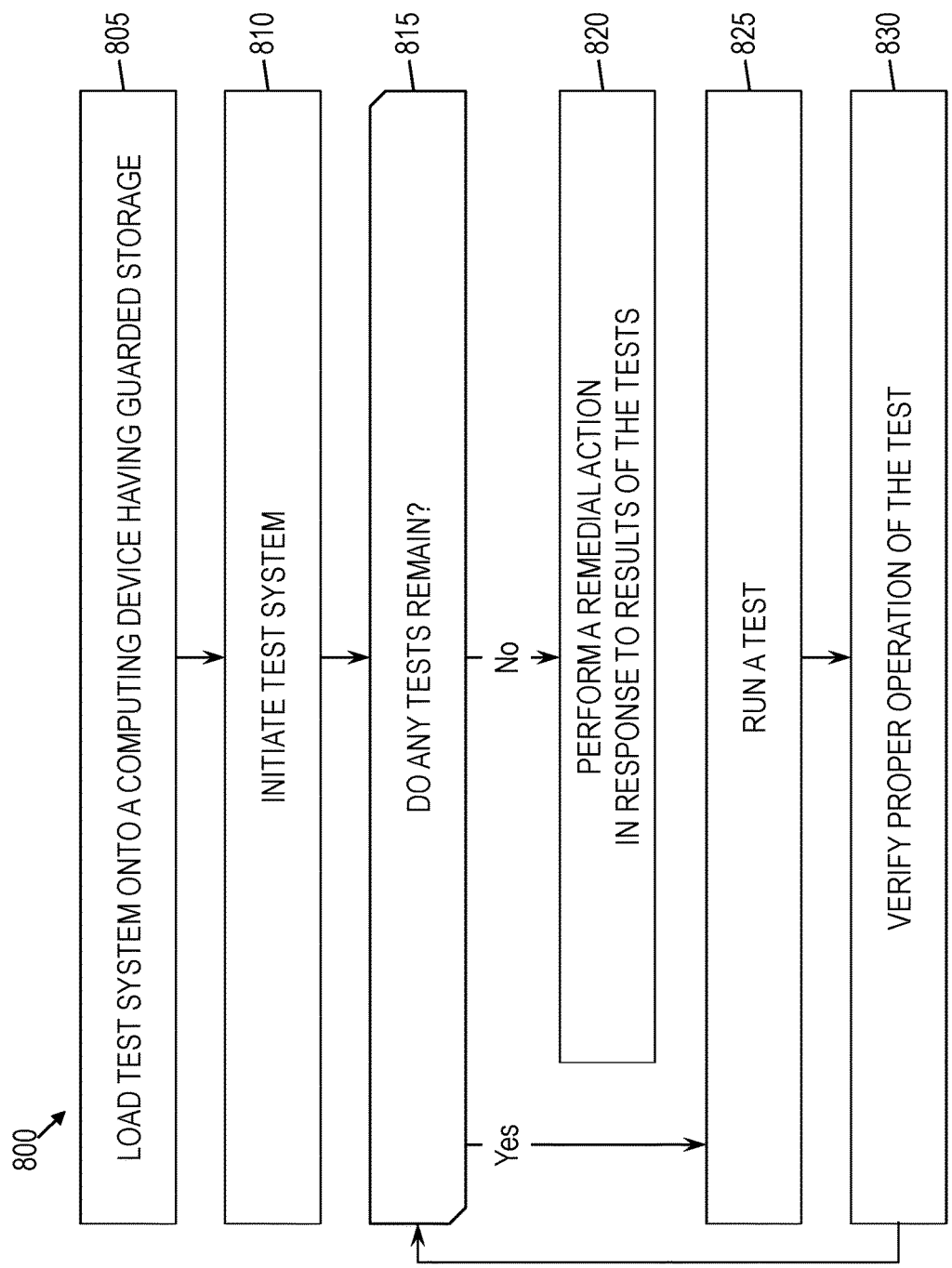
FIG. 8 is a flow diagram of a method for testing the functionality of IEP, according to some embodiments of this invention.

FIG. 8 is a flow diagram of a method 800 for testing IEP functionality on a computing device 150, according to some embodiments of this invention. As shown in FIG. 8, at block 805, the test system 100 may be loaded onto a computing device 150 having IEP. In some embodiments, the computing device 150 may be a new computer system, and the test system 100 may be used to verify operation of IEP on the computing device 150 before the computing device 150 is sold or otherwise released for use. At block 810, the test system 100 may be initiated on the computing device 150.

At decision block 815, the test system 100 may determine whether any tests not yet run are available to be run on the computing device 150. In some embodiments, this determination may be performed automatically by the test system 100, such as by determining whether any tests applicable to the computing device 150 have not yet been run on the computing device 150. If the computing device 150 or, if applicable, the virtual machine 155 on which the test system 100 was initiated is a uniprocessor system, then the test system 100 may seek a test designed for testing IEP on a uniprocessor system. If the computing device 150 or, if applicable, the virtual machine 155 on which the test system 100 was initiated is a multiprocessor system, then the test system 100 may seek a test designed for testing IEP on a multiprocessor system. However, if the computing device 150 includes both at least one uniprocessor system and at least one multiprocessor system, then tests for both uniprocessor and multiprocessor systems may be run on the computing device 150. In some embodiments, a user may manually determine whether a test not yet run is available to be run at decision block 815, and the test system's determination may thus be based on user entry.

If no tests remain to be run at decision block 815, then the method 800 may end at block 820 by automatically performing a remedial action on the computing device 150 in response to the results of the tests. In some embodiments, this remedial action may include reporting negative results of any tests run.

If a test is identified at decision block 815 as applicable and not yet having been run, then at block 825, the test system 100 may run that test. For example, and not by way of limitation, the test may be one of those described above. At block 830, after running the test, the test system 100 may verify proper operation of the test 110. In other words, the test system 100 may determine whether the test ran as expected. In some embodiments, the test system 100 may be aware of the expected results and may thus perform this verification automatically. Alternatively, however, manual verification may be received by the test system 100. The method 800 may then return to decision block 815 to determine whether additional tests remain to be run.

Figure 9:
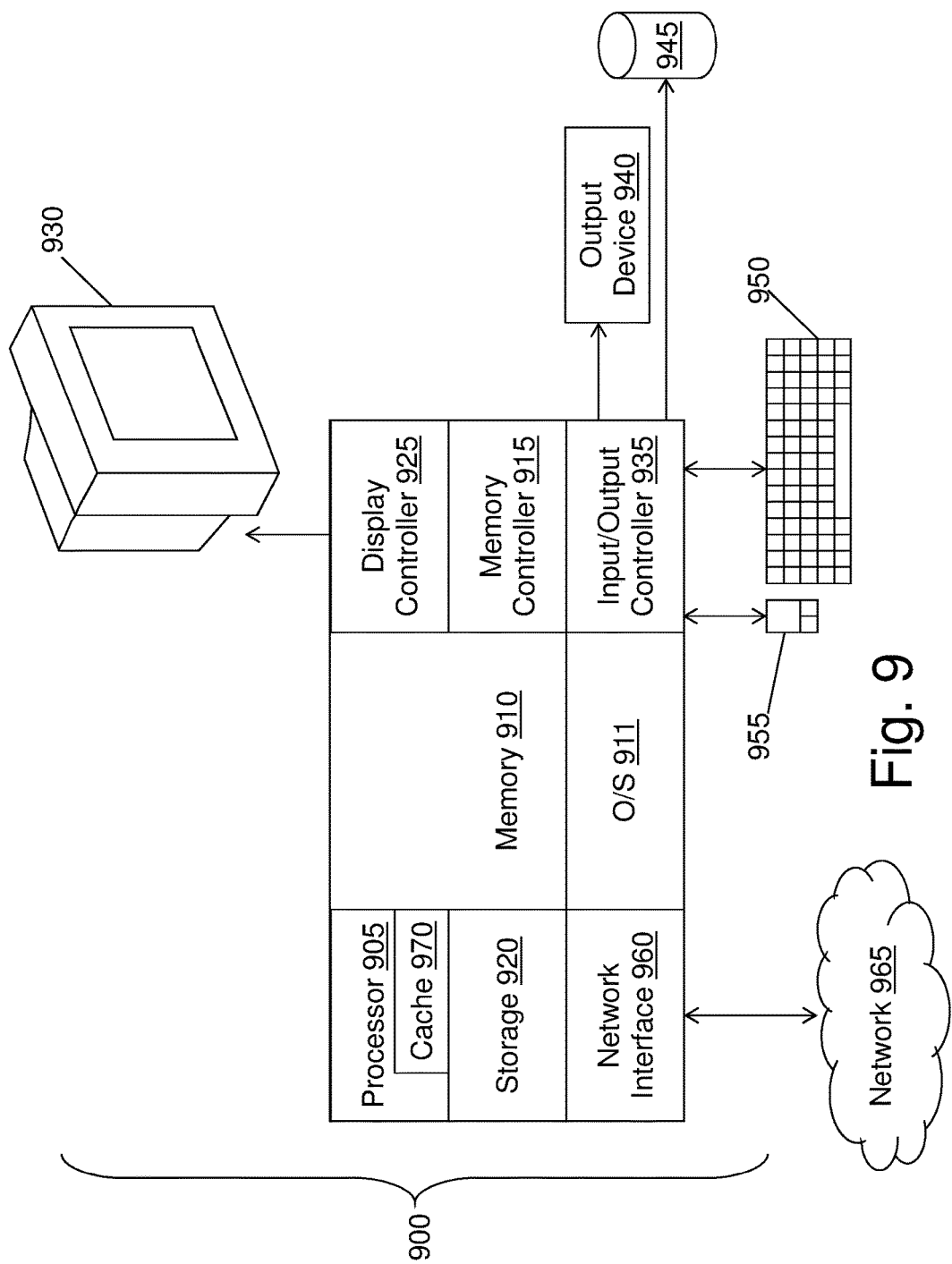
FIG. 9 is a block diagram of a computer system for implementing some or all aspects of the test system, according to some embodiments of this invention.

FIG. 9 illustrates a block diagram of a computer system 900 for use in implementing a test system 100 or method according to some embodiments. The test systems 100 and methods described herein may be implemented in hardware, software (e.g., firmware), or a combination thereof. In some embodiments, the methods described may be implemented, at least in part, in hardware and may be part of the microprocessor of a special or general-purpose computer system 900, such as a personal computer, workstation, minicomputer, or mainframe computer. For instance, the computing device 150 on which the test system 100 runs may be a computer system 900 as illustrated in FIG. 9.

In some embodiments, as shown in FIG. 9, the computer system 900 includes a processor 905, memory 910 coupled to a memory controller 915, and one or more input devices 945 and/or output devices 940, such as peripherals, that are communicatively coupled via a local I/O controller 935. These devices 940 and 945 may include, for example, a printer, a scanner, a microphone, and the like. Input devices such as a conventional keyboard 950 and mouse 955 may be coupled to the I/O controller 935. The I/O controller 935 may be, for example, one or more buses or other wired or wireless connections, as are known in the art. The I/O controller 935 may have additional elements, which are omitted for simplicity, such as controllers, buffers (caches), drivers, repeaters, and receivers, to enable communications.

The I/O devices 940, 945 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 905 is a hardware device for executing hardware instructions or software, particularly those stored in memory 910. The processor 905 may be a custom made or commercially available processor, a central processing unit (CPU), an auxiliary processor among several processors associated with the computer system 900, a semiconductor based microprocessor (in the form of a microchip or chip set), a macroprocessor, or other device for executing instructions. The processor 905 includes a cache 970, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 970 may be organized as a hierarchy of more cache levels (L1, L2, etc.).

The memory 910 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, or other types of storage media. Note that the memory 910 may have a distributed architecture, where various components are situated remote from one another but may be accessed by the processor 905.

The instructions in memory 910 may include one or more separate programs, each of which comprises an ordered listing of executable instructions for implementing logical functions. In the example of FIG. 9, the instructions in the memory 910 include a suitable operating system (OS) 911. The operating system 911 essentially may control the execution of other computer programs and provides scheduling, input-output control, file and data management, memory management, and communication control and related services.

Additional data, including, for example, instructions for the processor 905 or other retrievable information, may be stored in storage 920, which may be a storage device such as a hard disk drive or solid state drive. The stored instructions in memory 910 or in storage 920 may include those enabling the processor to execute one or more aspects of the test systems 100 and methods of this disclosure.

The computer system 900 may further include a display controller 925 coupled to a display 930. In some embodiments, the computer system 900 may further include a network interface 960 for coupling to a network 965. The network 965 may be an IP-based network for communication between the computer system 900 and an external server, client and the like via a broadband connection. The network 965 transmits and receives data between the computer system 900 and external systems. In some embodiments, the network 965 may be a managed IP network administered by a service provider. The network 965 may be implemented in a wireless fashion, e.g., using wireless protocols and technologies, such as WiFi, WiMax, etc. The network 965 may also be a packet-switched network such as a local area network, wide area network, metropolitan area network, the Internet, or other similar type of network environment. The network 965 may be a fixed wireless network, a wireless local area network (LAN), a wireless wide area network (WAN) a personal area network (PAN), a virtual private network (VPN), intranet or other suitable network system and may include equipment for receiving and transmitting signals.

Test systems 100 and methods according to this disclosure may be embodied, in whole or in part, in computer program products or in computer systems 900, such as that illustrated in FIG. 9.

Technical effects and benefits of some embodiments include the ability to test a computing device 150 to verify operation of IEP and, thus, to determine whether the computing device 150 will operate as intended for a user. Specifically, the test system 100 may run various tests to ensure that the IEP bit for storage blocks is respected in both uniprocessor and multiprocessor systems, whether physical or virtual.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
  executing one or more tests on a computing device, wherein the computing device comprises Instruction Execution Protection (IEP), and wherein each test of the one or more tests comprises selectively setting one or more IEP bits of one or more page tables, wherein each IEP bit prevents code in a respective storage block from being executed;
  detecting, by a computer processor of the computing device, during the one or more tests, an IEP exception each time an attempt is made to execute code in a storage block for which a respective IEP bit is set;

wherein the executing the one or more tests comprises executing a first test of the one or more tests, and wherein the executing the first test comprises:

instructing a uniprocessor to execute code in one or more protected storage blocks having respective IEP bits that are set; and instructing the uniprocessor to execute code in one or more unprotected storage blocks having respective IEP bits that are not set;

wherein the detecting the IEP exception each time an attempt is made to execute code in a storage block for which a respective IEP bit is set comprises detecting an IEP exception each time the uniprocessor attempts to execute code in the one or more protected storage blocks;

determining test results of the one or more tests based on the detecting; and performing a remedial action in response to the test results of the one or more tests.

2. The computer-implemented method of claim 1, wherein executing a second test of the one or more tests comprises:

instructing a master processor of a multiprocessor system to set the one or more IEP bits of the one or more page tables, wherein the one or more page tables correspond to one or more protected storage blocks in a common storage shared with a first set of slave processors;

wherein the detecting the IEP exception each time an attempt is made to execute code in a storage block for which a respective IEP bit is set comprises detecting an IEP exception each time at least one of the master processor and the first set of slave processors attempts to execute code in the one or more protected storage blocks in common storage.

3. The computer-implemented method of claim 2, wherein the executing the second test of the one or more tests further comprises:

instructing a second set of slave processors of the multiprocessor system to execute code in a second storage, wherein the second storage is absent protected storage blocks with respective IEP bits that are set.

4. The computer-implemented method of claim 1, wherein executing a second test of the one or more tests comprises:

instructing a master processor of a multiprocessor system to execute code in a first storage, wherein the first storage is absent protected storage blocks with respective IEP bits that are set;

instructing the master processor to set the one or more IEP bits of the one or more page tables, wherein the one or more page tables correspond to one or more protected storage blocks in a second storage;

instructing a first set of slave processors of the multiprocessor system to execute code in the second storage;

wherein the detecting the IEP exception each time an attempt is made to execute code in a storage block for which a respective IEP bit is set comprises detecting an IEP exception each time at least one of the first set of slave processors attempts to execute code in the one or more protected storage blocks in the second storage.

5. The computer-implemented method of claim 4, wherein the executing the second test of the one or more tests further comprises:

instructing a second set of slave processors of the multiprocessor system to execute code in a third storage, wherein the third storage is absent protected storage blocks with respective IEP bits that are set.

6. The computer-implemented method of claim 1, wherein executing a second test of the one or more tests comprises:

instructing a master processor of a multiprocessor system to execute code in a first storage;

instructing the master processor to set the one or more IEP bits of the one or more page tables, wherein the one or more page tables correspond to one or more protected storage blocks in the first storage;

instructing one or more slave processors of the multiprocessor system to execute code in the second storage, wherein the second storage is absent protected storage blocks with respective IEP bits that are set;

wherein the detecting the IEP exception each time an attempt is made to execute code in a storage block for which a respective IEP bit is set comprises detecting an IEP exception each time the master processor attempts to execute code in the one or more protected storage blocks in the first storage.

7. The computer-implemented method of claim 1, wherein the remedial action comprises reporting the test results of the one or more test programs.

8. A system comprising:

a memory having computer-readable instructions; and one or more processors for executing the computer-readable instructions, the computer readable instructions comprising:

executing one or more tests on a computing device, wherein the computing device comprises Instruction Execution Protection (IEP), and wherein each test of the one or more tests comprises selectively setting one or more IEP bits of one or more page tables, wherein each IEP bit prevents code in a respective storage block from being executed;

detecting, during the one or more tests, an IEP exception each time an attempt is made to execute code in a storage block for which a respective IEP bit is set;

wherein the executing the one or more tests comprises executing a first test of the one or more tests, and wherein the executing the first test comprises:

instructing a uniprocessor to execute code in one or more protected storage blocks having respective IEP bits that are set; and instructing the uniprocessor to execute code in one or more unprotected storage blocks having respective IEP bits that are not set;

wherein the detecting the IEP exception each time an attempt is made to execute code in a storage block for which a respective IEP bit is set comprises detecting an IEP exception each time the uniprocessor attempts to execute code in the one or more protected storage blocks;

determining test results of the one or more tests based on the detecting; and performing a remedial action in response to the test results of the one or more tests.

9. The system of claim 8, wherein executing a second test of the one or more tests comprises:

instructing a master processor of a multiprocessor system to set the one or more IEP bits of the one or more page tables, wherein the one or more page tables correspond to one or more protected storage blocks in a common storage shared with a first set of slave processors;

wherein the detecting the IEP exception each time an attempt is made to execute code in a storage block for which a respective IEP bit is set comprises detecting an IEP exception each time at least one of the master processor and the first set of slave processors attempts to execute code in the one or more protected storage blocks in common storage.

10. The system of claim 8, wherein executing a second test of the one or more tests comprises:
   instructing a master processor of a multiprocessor system to execute code in a first storage, wherein the first storage is absent protected storage blocks with respective IEP bits that are set;
   instructing the master processor to set the one or more IEP bits of the one or more page tables, wherein the one or more page tables correspond to one or more protected storage blocks in a second storage;
   instructing a first set of slave processors of the multiprocessor system to execute code in the second storage;
   wherein the detecting the IEP exception each time an attempt is made to execute code in a storage block for which a respective IEP bit is set comprises detecting an IEP exception each time at least one of the first set of slave processors attempts to execute code in the one or more protected storage blocks in the second storage.

11. The system of claim 8, wherein executing a second test of the one or more tests comprises:
   instructing a master processor of a multiprocessor system to execute code in a first storage;
   instructing the master processor to set the one or more IEP bits of the one or more page tables, wherein the one or more page tables correspond to one or more protected storage blocks in the first storage;
   instructing one or more slave processors of the multiprocessor system to execute code in the second storage, wherein the second storage is absent protected storage blocks with respective IEP bits that are set;
   wherein the detecting the IEP exception each time an attempt is made to execute code in a storage block for which a respective IEP bit is set comprises detecting an IEP exception each time the master processor attempts to execute code in the one or more protected storage blocks in the first storage.

12. The system of claim 8, wherein the remedial action comprises reporting the test results of the one or more test programs.

13. A computer-program product for testing functionality of Instruction Execution Protection (IEP), the computer-program product comprising a non-transitory computer-readable storage medium having program instructions embodied therewith, the program instructions executable by a processor to cause the processor to perform a method comprising:
   executing one or more tests on a computing device, wherein the computing device comprises IEP, and wherein each test of the one or more tests comprises selectively setting one or more IEP bits of one or more page tables, wherein each IEP bit prevents code in a respective storage block from being executed;
   detecting, during the one or more tests, an IEP exception each time an attempt is made to execute code in a storage block for which a respective IEP bit is set;
   wherein the executing the one or more tests comprises executing a first test of the one or more tests, and wherein the executing the first test comprises:
      instructing a uniprocessor to execute code in one or more protected storage blocks having respective IEP bits that are set; and
      instructing the uniprocessor to execute code in one or more unprotected storage blocks having respective IEP bits that are not set;
      wherein the detecting the IEP exception each time an attempt is made to execute code in a storage block for which a respective IEP bit is set comprises detecting an IEP exception each time the uniprocessor attempts to execute code in the one or more protected storage blocks;
   determining test results of the one or more tests based on the detecting; and
   performing a remedial action in response to the test results of the one or more tests.

14. The computer-program product of claim 13, wherein executing a second test of the one or more tests comprises:
   instructing a master processor of a multiprocessor system to set the one or more IEP bits of the one or more page tables, wherein the one or more page tables correspond to one or more protected storage blocks in a common storage shared with a first set of slave processors;
   wherein the detecting the IEP exception each time an attempt is made to execute code in a storage block for which a respective IEP bit is set comprises detecting an IEP exception each time at least one of the master processor and the first set of slave processors attempts to execute code in the one or more protected storage blocks in common storage.

15. The computer-program product of claim 13, wherein executing a second test of the one or more tests comprises:
   instructing a master processor of a multiprocessor system to execute code in a first storage, wherein the first storage is absent protected storage blocks with respective IEP bits that are set;
   instructing the master processor to set the one or more IEP bits of the one or more page tables, wherein the one or more page tables correspond to one or more protected storage blocks in a second storage;
   instructing a first set of slave processors of the multiprocessor system to execute code in the second storage;
   wherein the detecting the IEP exception each time an attempt is made to execute code in a storage block for which a respective IEP bit is set comprises detecting an IEP exception each time at least one of the first set of slave processors attempts to execute code in the one or more protected storage blocks in the second storage.

16. The computer-program product of claim 13, wherein executing a second test of the one or more tests comprises:
   instructing a master processor of a multiprocessor system to execute code in a first storage;
   instructing the master processor to set the one or more IEP bits of the one or more page tables, wherein the one or more page tables correspond to one or more protected storage blocks in the first storage;
   instructing one or more slave processors of the multiprocessor system to execute code in the second storage, wherein the second storage is absent protected storage blocks with respective IEP bits that are set;
   wherein the detecting the IEP exception each time an attempt is made to execute code in a storage block for which a respective IEP bit is set comprises detecting an IEP exception each time the master processor attempts to execute code in the one or more protected storage blocks in the first storage.

17. The computer-program product of claim 13, wherein the remedial action comprises reporting the test results of the one or more test programs.

* * * * *